(12) United States Patent
Merassi et al.

(10) Patent No.: US 7,886,601 B2
(45) Date of Patent: Feb. 15, 2011

(54) MICROELECTROMECHANICAL SENSOR HAVING MULTIPLE FULL-SCALE AND SENSITIVITY VALUES

(75) Inventors: Angelo Merassi, Vigevano (IT); Sarah Zerbini, Cornaredo (IT); Hubert Geitner, Munich (DE); Marco Del Sarto, Massa (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 397 days.

(21) Appl. No.: 11/978,056

(22) Filed: Oct. 26, 2007

(65) Prior Publication Data
US 2008/0098815 A1 May 1, 2008

(30) Foreign Application Priority Data
Oct. 27, 2006 (IT) .......................... TO2006A0774

(51) Int. Cl.
*G01P 15/125* (2006.01)
(52) U.S. Cl. ..................................... 73/514.32; 361/280
(58) Field of Classification Search ............. 73/514.32, 73/514.18; 361/280, 283.1
See application file for complete search history.

(56) References Cited

U.S. PATENT DOCUMENTS

| | | | | |
|---|---|---|---|---|
| 6,841,992 B2 * | 1/2005 | Yue et al. | .................. | 73/514.32 |
| 6,868,726 B2 * | 3/2005 | Lemkin et al. | ........... | 73/514.32 |
| 7,004,027 B2 * | 2/2006 | Suzuki | ..................... | 73/514.32 |

* cited by examiner

*Primary Examiner*—John E Chapman
(74) *Attorney, Agent, or Firm*—Lisa K. Jorgenson; Karl L. Klassen; Seed IP Law Group PLLC

(57) ABSTRACT

A microelectromechanical sensing structure is provided with a mobile element adapted to be displaced as a function of a quantity to be detected, and first fixed elements, capacitively coupled to the mobile element and configured to implement with the mobile element first detection conditions. The sensing structure is further provided with second fixed elements, capacitively coupled to the mobile element and configured to implement with the mobile element second detection conditions, which are different from the first detection conditions. In particular, the first and second detection conditions differ with respect to a full-scale or a sensitivity value in the detection of the aforesaid quantity.

23 Claims, 4 Drawing Sheets

MICROELECTROMECHANICAL SENSOR HAVING MULTIPLE FULL-SCALE AND SENSITIVITY VALUES

BACKGROUND

1. Technical Field

The present invention relates to a microelectromechanical (MEMS) sensor having multiple full-scale and sensitivity values. In particular, in what follows reference will be made, without this, however, implying any loss in generality, to an accelerometer sensor.

2. Description of the Related Art

As is known, microelectromechanical sensors made in semiconductor technology are today used in a wide range of technological sectors, thanks to their small dimensions, versatility, and low costs. In particular, accelerometer sensors today find a wide range of uses in the "automotive" field, for example in airbag systems, in stability-control systems (ESP®—Electronic Stability Program) and in systems for brake-assistance (ABS—Antilock Braking System).

In a known way, accelerometers for airbag-control systems have a measuring scale with high full-scale values (for example, 50 g, where g is gravitational acceleration), whilst lower full-scale values (for example, between 2 g and 6 g) are in accelerometers for stability-control and brake-assistance systems. The full-scale value of these sensors, in addition to indicating a maximum detectable value, is in general associated to the sensitivity of the sensors, since the dynamic range of a corresponding output signal is fixed (for example, comprised between 0 and 5 V, in the case of a voltage output signal). In other words, an increase in the full-scale value is to be considered as equivalent to a decrease in the sensitivity of the sensor (and vice versa), and a sensor having a low full-scale value has a high sensitivity (and vice versa).

Currently, in MEMS accelerometer sensors the implementation of different full-scale (or sensitivity) values is entrusted to a corresponding reading electronics, which achieves this by varying a gain factor of an amplification stage in the signal-processing chain.

In detail, and as is shown schematically in FIG. 1, a conventional MEMS accelerometer 1 generally comprises a sensing structure 2 made with micromachining techniques of a semiconductor material and having a rotor (or mobile element) and a first stator and a second stator (or fixed elements). The first and second stators are capacitively coupled to the rotor so as to form a first sensing capacitor C1 and a second sensing capacitor C2 (in particular, the first and second stators face the rotor, forming plane parallel plate capacitors). The sensing structure 2 has at its output a first and second stator contacts S1, S2 and a rotor contact R, which constitute the terminals of the first and second sensing capacitors C1, C2. The rotor is free to be displaced (in particular by linear motion) with respect to the first and second stators as a function of the acceleration, consequently varying the value of capacitance of the first and second sensing capacitors C1, C2. From the differential capacitive unbalancing of the sensing capacitors, a reading electronics 4 coupled to the sensing structure 2 is able to determine the value of the acceleration acting on the MEMS accelerometer 1. In greater detail, the reading electronics 4 comprises: a processing stage 6 adapted to convert the capacitive unbalancing signal into an electrical signal and to filter and process this signal in a suitable way, and a gain stage 7, connected to the output of the processing stage 6, having a variable gain that can be selected via a full-scale selection command FS, that is provided at an input of the reading electronics 4. According to the requirements, by acting on the full-scale selection command FS, it is possible to vary the full-scale value of the MEMS accelerometer 1 (for example, between 2 g and 6 g, or else between 35 g and 50 g), and consequently to vary its sensitivity, so as to adapt it to different applications.

The described solution, albeit advantageous in so far as it enables easy variation of the full-scale value of the accelerometer sensor, has certain drawbacks, amongst which the difficulty of implementing a wide range of full-scale values by acting on the gain stage 7, and the non-linearity of the response of the MEMS accelerometer 1 for high full-scale values. The latter aspect is due to the fact that, as is known, the capacitance of a plane parallel plate capacitor is linear for small displacements (as compared to the distance, or gap, between its plates), whilst it is non linear for large displacements (comparable to the aforesaid distance between the plates).

BRIEF SUMMARY

At least some embodiments of the present invention provide a microelectromechanical sensor having multiple full-scale and sensitivity values that provide an improvement with respect to known sensors. The microelectromechanical sensor may enable the aforementioned problems and disadvantages to be solved, either totally or in part.

BRIEF DESCRIPTION OF THE SEVERAL VIEWS OF THE DRAWINGS

For a better understanding of the present invention, embodiments are now described, purely by way of non-limiting examples and with reference to the attached drawings, wherein.

DETAILED DESCRIPTION

As will be described in detail in what follows, at least some embodiments of the present invention envisage the implementation of different full-scale values directly in the mechanical sensing structure of the sensor, without resorting, or possibly resorting, to a corresponding reading electronics.

Figure 1:
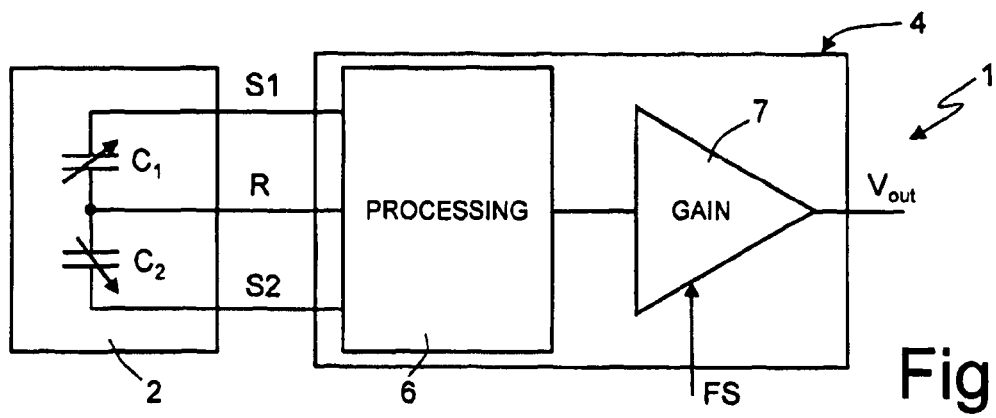
FIG. 1 shows a block diagram of a microelectromechanical sensor, in particular an accelerometer sensor, of a known type.
Figure 2:
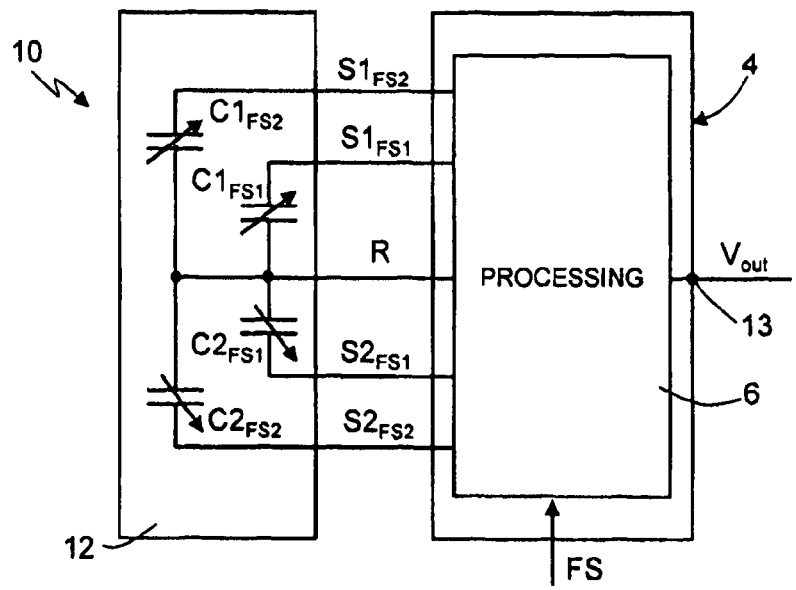
FIG. 2 shows a block diagram of an accelerometer sensor, according to a first embodiment of the present invention.

With reference to FIG. 2, relating to a first embodiment of the present invention, a microelectromechanical sensor, in particular a MEMS accelerometer 10, comprises a sensing structure 12 made of semiconductor material, for example silicon, and a reading electronics (designated once again by 4 as in FIG. 1), which is connected to the sensing structure 12 and supplies at its output 13 an electrical signal $V_{out}$, indicative of the acceleration detected by the sensor and having a pre-set output dynamic range (for example, comprised between 0 and 5 V). The reading electronics 4 comprises a processing stage 6, which is adapted to process an electrical quantity coming from the sensing structure 12 and to generate the electrical signal $V_{out}$ and receives at its input a full-scale selection command FS.

In detail, the sensing structure 12 comprises a single rotor, and a pair of stators for each full-scale value FS1, FS2 that the sensor is able to implement (FIG. 2, as well as the subsequent figures, refers to the presence of two full-scale values, but it is evident that what is described can be extended to an arbitrary number of full-scale values). Each pair of stators forms with the rotor a respective first sensing capacitor ($C1_{FS1}$, $C1_{FS2}$) and a respective second sensing capacitor ($C2_{FS1}$, $C2_{FS2}$), for detection of accelerations at a respective full-scale value FS1, FS2. In particular, as will be clarified hereinafter, the stators of each pair are configured with respect to the rotor so as to implement different conditions of acceleration detection (in terms of full-scale value and sensitivity). The sensing structure 12 consequently has at its output a rotor contact R, a first pair of stator contacts $S1_{FS1}$, $S2_{FS1}$ corresponding to the first full-scale value FS1, and a second pair of stator contacts $S1_{FS2}$, $S2_{FS2}$ corresponding to the second full-scale value FS2. The full-scale selection command FS acts on the processing stage 6, connecting it selectively to the first pair of stators or to the second pair of stators, according to the selected full-scale value, for subsequent signal processing.

Figure 3:
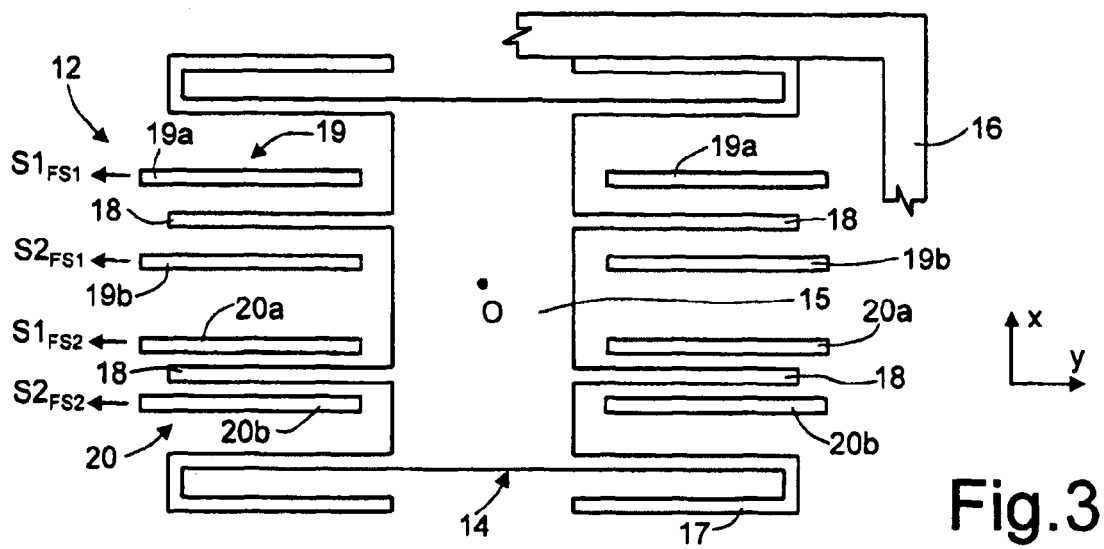
FIG. 3 is a schematic plan view of a microelectromechanical sensing structure of the accelerometer sensor of FIG. 2.

In greater detail (FIG. 3), the sensing structure 12 comprises a rotor 14, having a body 15 of a substantially rectangular shape elongated in a first direction x and mechanically connected to a frame support 16 by means of elastic elements 17, which enable a (translation) movement thereof in the first direction x. A plurality of rotor electrodes 18 extends laterally from longer sides of the rotor body 15, in a second direction y substantially orthogonal to the first direction x. In particular, the rotor electrodes 18 are arranged symmetrically with respect to a central point O of the rotor body 15, and with respect to a median axis parallel to the first direction x and passing through the central point O.

The sensing structure 12 further comprises a first and second pair of stators 19 and 20 corresponding, respectively, to the first full-scale value FS1 and to the second full-scale value FS2 that can be implemented by the sensing structure. Each pair of stators 19, 20 comprises a respective plurality of first and second stator electrodes 19a, 19b and 20a, 20b, extending in the second direction y, parallel to and facing on opposite sides of respective rotor electrodes 18, with which they form a plurality of plane parallel plate sensing capacitors. The first and, respectively, the second stator electrodes 19a, 19b of the first pair of stators 19 are connected together and to a respective contact of the first pair of stator contacts $S1_{FS1}$, $S2_{FS1}$ (as shown schematically), whilst the first and, respectively, the second stator electrodes 20a, 20b of the second pair of stators 20 are connected together and to a respective contact of the second pair of stator contacts $S1_{FS2}$, $S2_{FS2}$. The resulting parallel connection of the various sensing capacitors forms the first and second sensing capacitors $C1_{FS1}$, $C1_{FS2}$ and $C2_{FS1}$, $C2_{FS2}$ corresponding to the full-scale values FS1, FS2 of the sensor.

According to an aspect of the present invention, the first and second stator electrodes 19a, 19b of a first pair of stators (in particular of the first pair of stators 19, associated to the higher full-scale value, FS1) are arranged at a relative distance (i.e., gap) from the respective rotor electrodes 18, which is greater than a relative distance between the stator electrodes 20a, 20b of the other pair of stators (in particular, of the second pair of stators 20 associated to the lower full-scale value, FS2) and the respective rotor electrodes 18. In fact, the sensitivity value of the sensor is proportional to a capacitance value at rest (i.e., in the absence of displacements of the rotor 14) of the sensing capacitors and to the amount of their capacitive variation due to displacement of the rotor 14. Electrodes spaced further away from one another correspond to a smaller value of capacitance at rest and a smaller capacitive variation than to electrodes set closer to one another. In detail, there is a non-linear (quadratic) relation between the sensitivity of the sensor and the distance between the electrodes.

The different arrangement of the first and second pairs of stators 19, 20 with respect to the rotor electrodes 18 thus allows two different full-scale values FS1, FS2 (and, equivalently, sensitivity values) within the same sensing structure 12, which can be selected by the reading electronics.

The described sensing structure is substantially linear both for low (FS1) and for high (FS2) full-scale values, due to the fact that the distance at rest between the electrodes of the sensing capacitors is related to the full-scale value to which they are associated. In particular, the distance increases as the full-scale value increases. Accordingly, the displacements of the rotor electrodes with respect to the stator electrodes are "small" as compared to the distance at rest, and the sensing structure is made to work in the linear area of the capacitance versus displacement curve.

Figure 4:
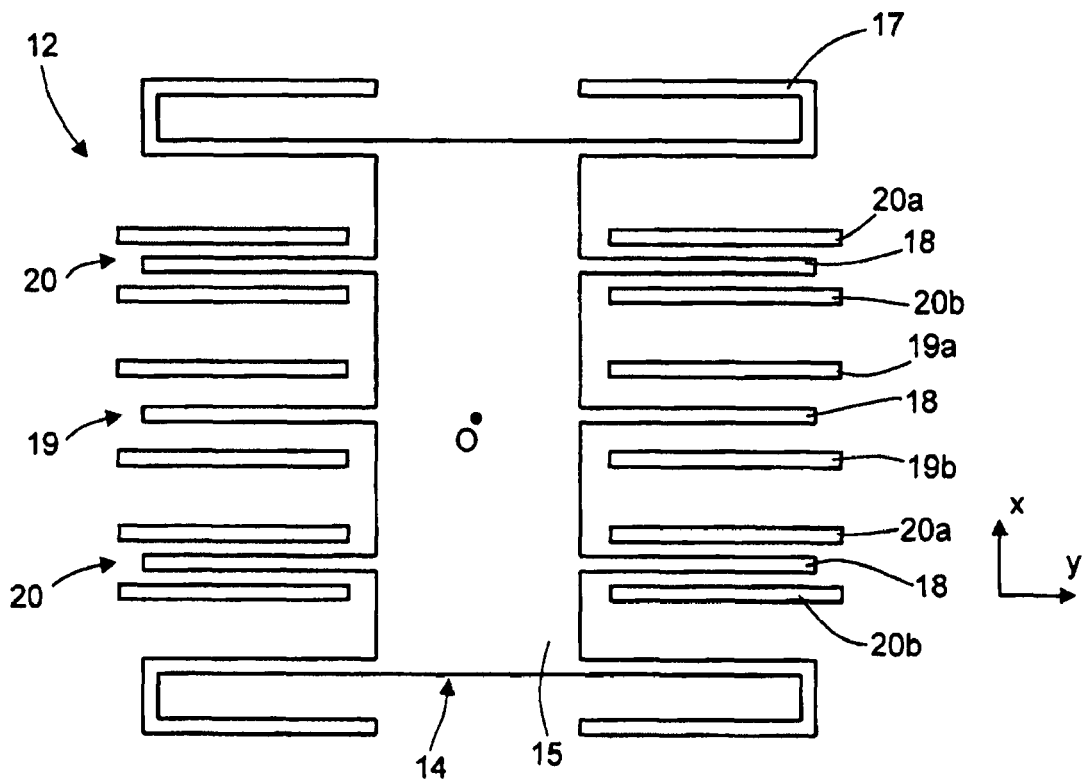
FIG. 4 is a schematic plan view of a variant of the sensing structure.

In accordance to a variant of the invention (FIG. 4), the first and second pairs of stators 19, 20 have a different number of respective first and second stator electrodes 19a, 19b and 20a, 20b, according to the full-scale value (or, equivalently, the value of sensitivity) to which they are associated. In particular, the pair of stators (in the example in the figure the second pair of stators 20) associated to the lower full-scale value (higher sensitivity value) has a greater number of stator electrodes 20a, 20b. In fact, by increasing the number of the stator electrodes, the number of plane parallel plate capacitors connected in parallel increases, and consequently the value of the capacitance at rest of the sensing capacitors and their capacitive variation as a function of the acceleration increase (in particular, in a linear way). By combining the two described variants, the sensitivity in detection of acceleration can be increased or decreased by modifying both the distance between the stator and rotor electrodes and the number of stator electrodes.

Figure 5:
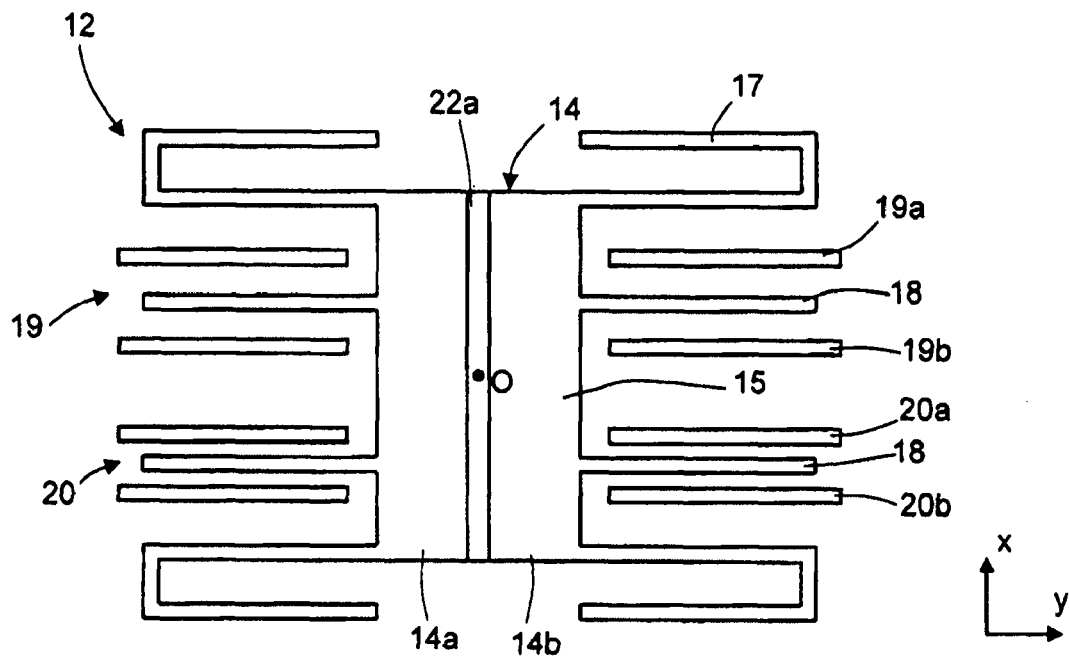
FIG. 5 is a schematic plan view of a sensing structure of an accelerometer sensor, according to a second embodiment of the present invention.

A second embodiment of the present invention (FIG. 5) envisages splitting the rotor 14 of the sensing structure 12 into first and second rotor halves 14a, 14b, electrically insulated from one another by means of an insulating barrier 22a made of dielectric material (obtained in a known manner, for example as described in EP 1 617 178). In particular, the insulating barrier 22a extends in the first direction x at the median axis of the rotor body 15, throughout the length of the rotor. Connected to each rotor half 14a, 14b are half of the rotor electrodes 18 and half of the first and second stator electrodes 19a, 19b and 20a, 20b, respectively of the first and second pairs of stators 19, 20.

Figure 6:
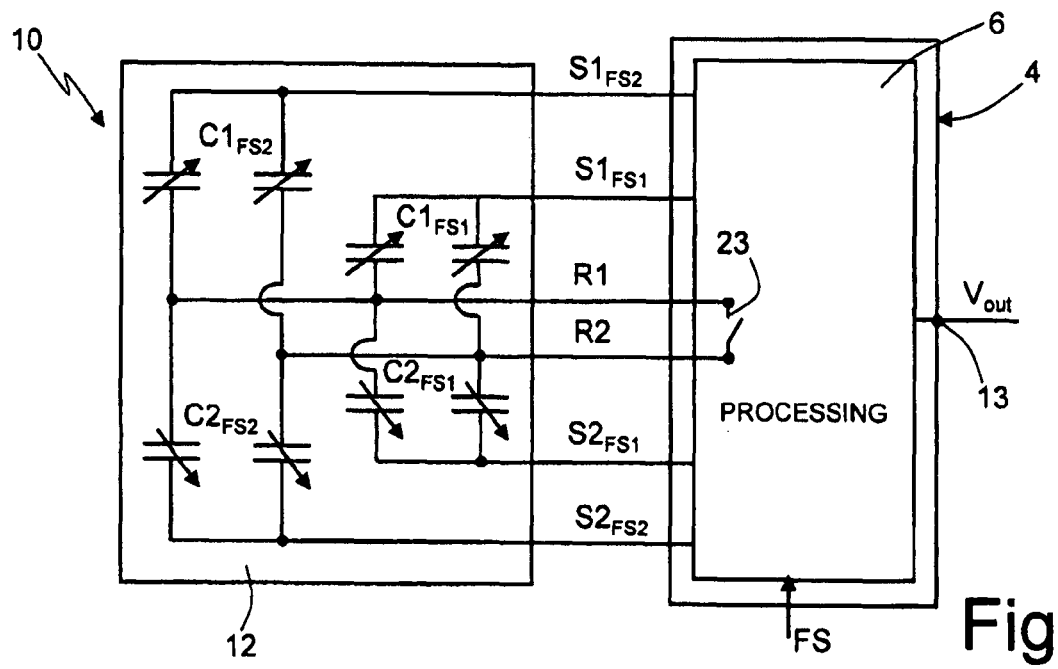
FIG. 6 shows a block diagram of an accelerometer sensor including the sensing structure of FIG. 5.

As shown also in FIG. 6, in this case the sensing structure 12 has, instead of a single rotor contact, a first rotor contact R1 and a second rotor contact R2, electrically connected to the first rotor half 14a and to the second rotor half 14b, respectively. The processing stage 6 internally has a switch element 23 (shown schematically), arranged between the first and second rotor contacts R1, R2, for electrically connecting them together, or not.

Thanks to this configuration, it is possible to double the available full-scale values by simply electrically connecting (or not) to one another the two rotor halves 14a, 14b (in this way doubling or halving the number of stator and rotor electrodes, and consequently the sensitivity of the sensor). The full-scale selection command FS consequently acts both on the stator contacts $S1_{FS1}$, $S2_{FS1}$, $S1_{FS2}$, $S2_{FS2}$ and on the switch element 23 (connecting the rotor contacts R1, R2 to one another), for the selection of the desired full-scale value. In particular, with the switch element 23 in an open condition, the first and second full scales FS1, FS2 have a certain value, which is doubled by simply closing the selector element (thus obtaining a third full scale and a fourth full scale, of twice the value with respect to the first and second full scales).

Figure 7:
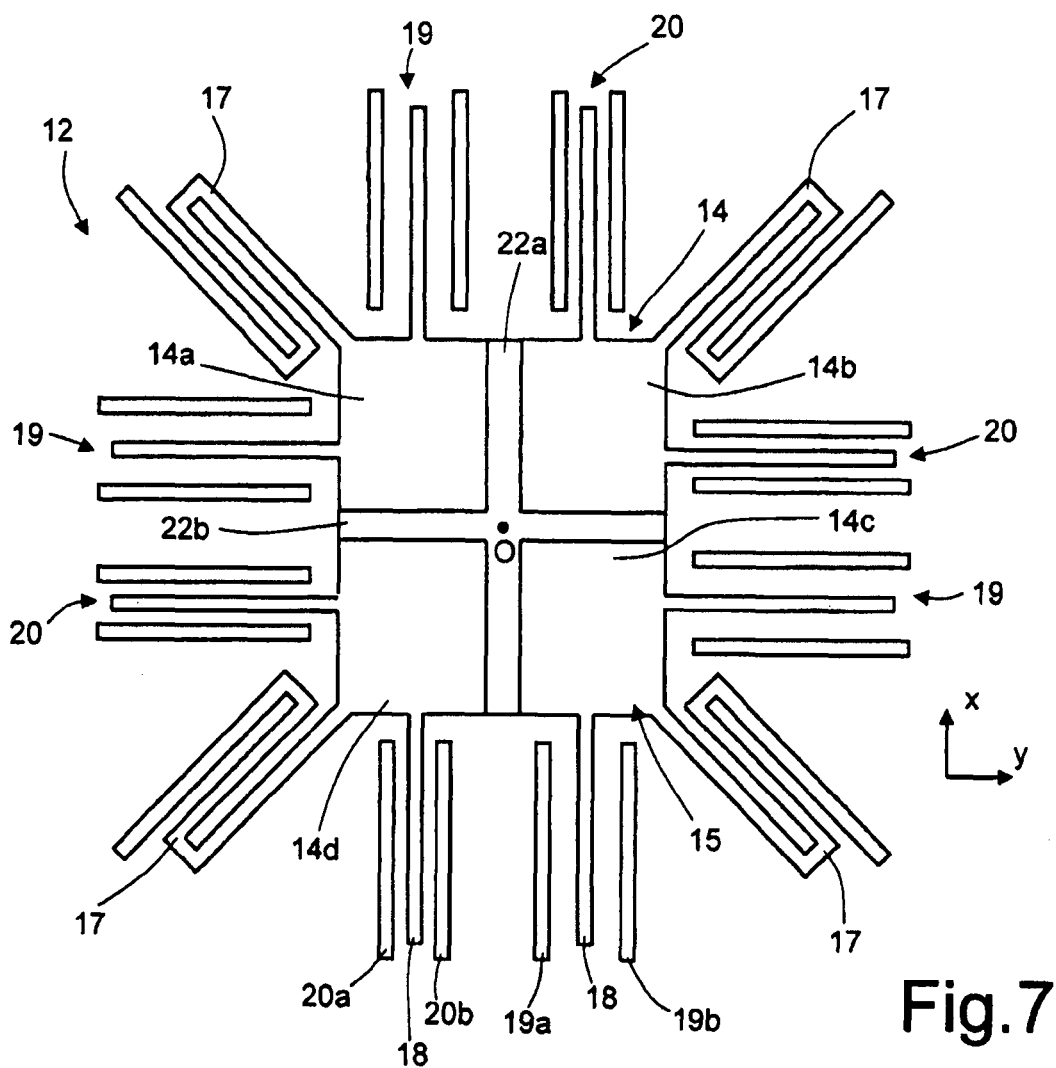
FIG. 7 is a schematic plan view of a sensing structure of an accelerometer sensor, according to a third embodiment of the present invention.

Using the solutions described above, it is also possible to provide a biaxial accelerometer sensor (FIG. 7).

In detail, the rotor body 15 of the sensing structure 12 has in this case a substantially square shape in plan view, and the rotor 14 is divided into four rotor quadrants 14a-14d by a first insulating barrier 22a and a second insulating barrier 22b, arranged to form a cross. The rotor quadrants 14a-14d are symmetrical with respect to the central point O, and the first and second insulating barriers 22a, 22b are parallel, respectively, to the first and second directions x, y, and pass through the central point O.

A rotor electrode 18 extends from the external sides of each rotor quadrant 14a-14d, in a direction substantially orthogonal to these sides and parallel to one of the first direction x and the second direction y. Within each rotor quadrant 14a-14d, first and second stator electrodes 19a, 19b and 20a, 20b face on opposite sides the corresponding rotor electrodes 18 (so as to ensure one and the same sensitivity value in the first and second direction x, y). In addition, the stator electrodes are arranged as a whole in a symmetrical way with respect to the central point O.

The elastic elements 17 in this case allow the rotor 14 to have freedom of movement both in the first direction x and in the second direction y, and consequently allow detecting accelerations in the first direction x (by means of the rotor and stator electrodes parallel to the second direction y) and in the second direction y (by means of the rotor and stator electrodes parallel to the first direction x).

In a way not illustrated, four rotor contacts are provided for connecting electrically to one another the various rotor quadrants 14a-14d, and corresponding selector elements (in a way altogether similar to what is illustrated in FIG. 6), controlled by the full-scale selection command FS.

Figure 8:
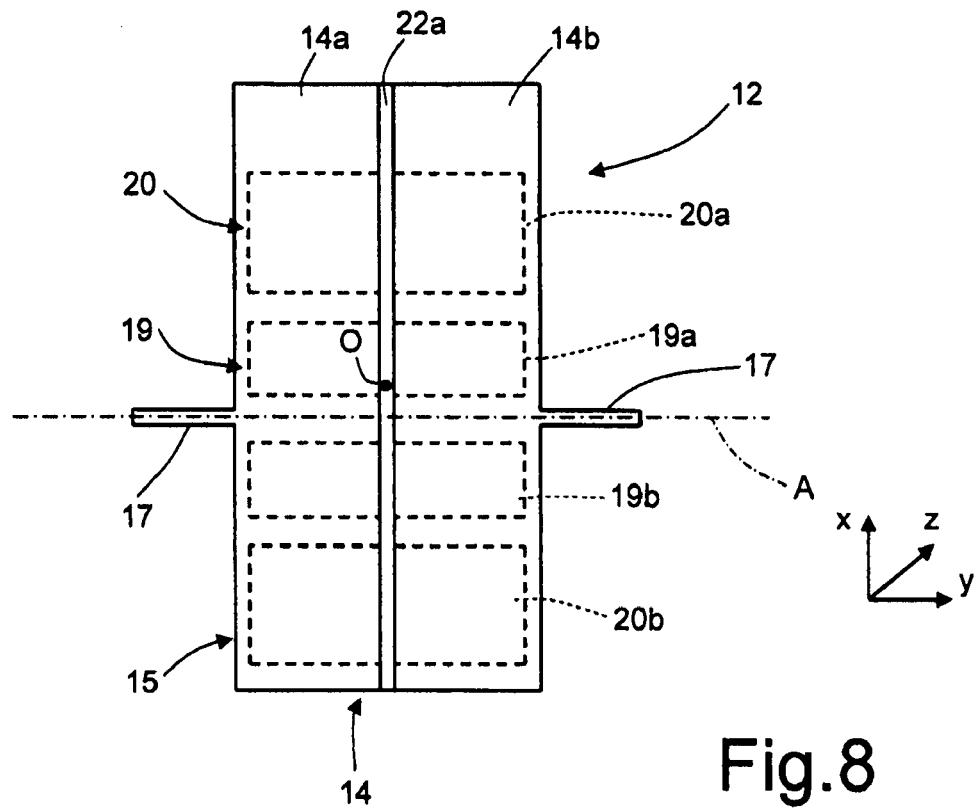
FIG. 8 is a schematic plan view of a sensing structure of an accelerometer sensor, according to a fourth embodiment of the present invention.

FIG. 8 shows an embodiment of an accelerometer sensor sensitive to accelerations directed in a third direction z, orthogonal to the first and second directions x, y, and in particular to a plane of main extension xy of the rotor 14.

In detail, the elastic elements 17, which mechanically connect the rotor body 15 to the support, extend in line along a tilting axis A, parallel to the second direction y and shifted with respect to the central point O. In this way, the elastic elements 17 enable an inclination of the rotor 14 outside of its plane of main extension xy, by means of a rotation around the tilting axis A. The stator electrodes are arranged in a position facing the rotor 14 underneath its plane of main extension xy so that the inclination of the rotor body 15 causes a variation in the distance between the electrodes and the rotor, and a consequent capacitive variation.

Because certain types of manufacturing processes may not be suitable for varying the distances at rest between the stator electrodes and the rotor in the third direction z, the various full-scale/sensitivity values can be obtained by varying the facing area of the electrodes (varying, i.e., their dimensions in the first and second directions x, y), or their number. In addition, it is possible to vary the sensitivity by arranging the stator electrodes at different distances with respect to the tilting axis A. In fact, electrodes set at a greater distance apart approach the rotor body 15 more closely during its rotation about the tilting axis A, and consequently give rise to a greater capacitive increase.

In detail, and with reference once again to the implementation of two different full-scale values FS1, FS2, the first pair of stators 19 associated to the higher full-scale value FS1 will have the respective stator electrodes 19a, 19b arranged in the proximity of the axis of tilting A and will have a first facing surface (parallel to the plane of main extension xy), while the second pair of stators 20 associated to the smaller full-scale value FS2 will have the respective stator electrodes 20a, 20b arranged at a greater distance from the tilting axis A and having a second facing surface, greater than the first facing surface.

From what has been described and illustrated above, the advantages of the microelectromechanical sensor according to at least some embodiments of the invention are clear.

In particular, in a single microelectromechanical sensing structure 12, different detection conditions of a same quantity to be detected are implemented (in terms of measuring scale, and in particular of full-scale, or equivalently sensitivity, value), for adapting the detection of the quantity to be determined to different applications and uses of the sensor. Given that a single sensing structure is envisaged, the sensor occupies a relatively small overall area and has a reduced manufacturing complexity.

As compared to traditional sensors, in which variation of a full-scale value is provided by the reading electronics (with the sensitivity value of the mechanical sensing structure being fixed), the embodiments of FIGS. 2-9 may enable a wider range of full-scale values to be obtained. In fact, embodiments disclosed herein make it possible to act on a number of factors to vary the full-scale value and the sensitivity, among which the number of the stator electrodes, the number of insulated portions in which the rotor is divided, the distance between the stator and rotor electrodes, and the corresponding facing area. In particular, varying the distance at rest between the stator electrodes and the rotor proves advantageous, given the quadratic dependence of the sensitivity with respect to this quantity, since it enables an even wider range of full-scale values to be obtained.

In addition, the linearity of the sensor remains high also for high full-scale values, thanks to the fact that the sensor is made to work for the most part in conditions of small displacements, as described above.

In particular, it is evident that various combinations of the solutions described can lead to further embodiments. For example, a triaxial accelerometer sensitive to accelerations directed in the first, second, and third directions x, y, z can be provided.

Figure 9:
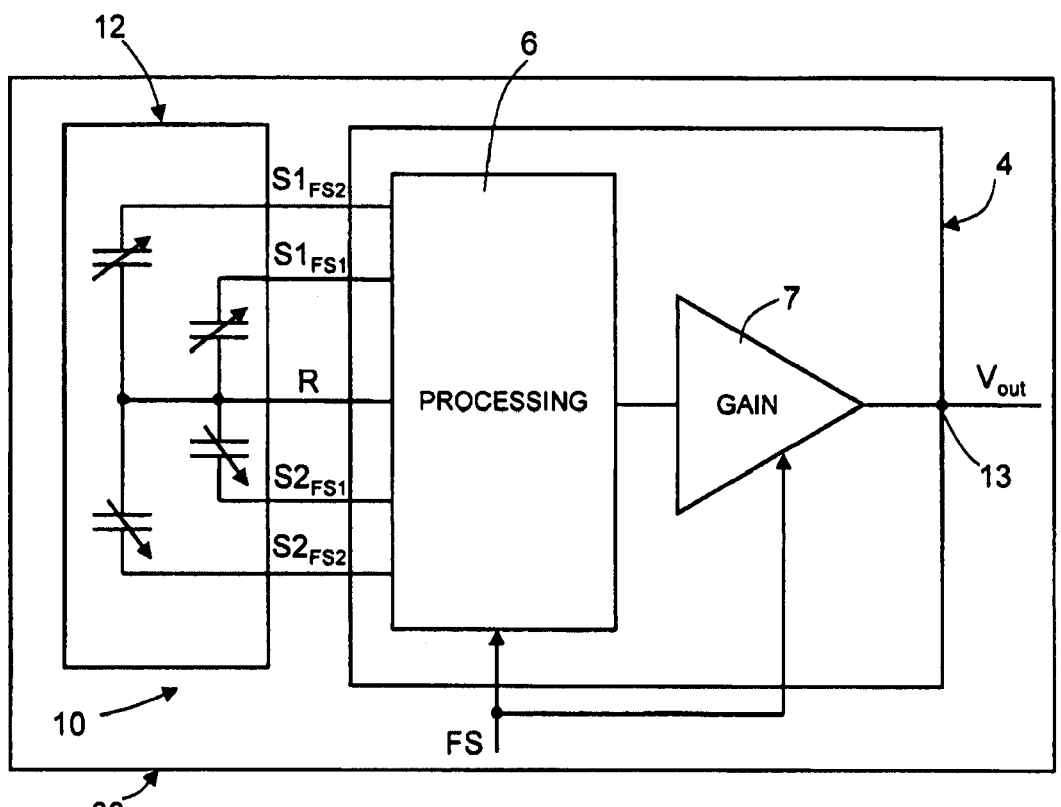
FIG. 9 shows a block diagram of an accelerometer sensor, according to a further variant of the present invention.

As illustrated in FIG. 9 (which is related, purely by way of example, to the first embodiment of the invention), the range of the full-scale values that can be implemented can be further enlarged by introducing a gain stage in the reading electronics. In detail, a gain stage 7 is connected to the output of the processing stage 6, for varying electronically the gain of the signal-processing chain. The full-scale selection command FS acts in this case both on the output of the sensing structure 12 (selecting the stator and rotor contacts) and on the gain stage 7, for selecting the desired full-scale value. FIG. 9 also shows an electronic device 30 incorporating the MEMS accelerometer 10. Advantageously, the electronic device 30 can be included in an automotive system, for control of the airbag system, ABS, and stability-control system. The full-scale value of the sensor can be selected according to the specific applications and requirements.

Different geometrical shapes for the rotor and for the pairs of stators can also be used, and the arrangement of the stator electrodes with respect to the rotor could be different. In particular, in a known manner, the stator electrodes could be arranged in a "single-sided" configuration with respect to the rotor electrodes (i.e., facing just a single main side of the rotor electrodes).

Finally, the embodiments and features described herein can be applied to other types of MEMS sensors, for example gyroscopes, or more in general to sensors provided with a sensing structure having parallel plate capacitors.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical sensing structure comprising:
   a mobile element adapted to be displaced as a function of a quantity to be detected;
   first fixed elements capacitively coupled to said mobile element and configured to implement with said mobile element to provide first detection conditions of said quantity; and
   second fixed elements capacitively coupled to said mobile element and configured to implement with said mobile element to provide second detection conditions of said quantity, wherein said second detection conditions are different from said first detection conditions with respect to a full-scale value and a sensitivity value associated with detection of said quantity, wherein a total number of all of said first fixed elements is higher than a total number of all of said second fixed elements, and a lower value of said full scale and a higher value of said sensitivity is associated with said first fixed elements.

2. The sensing structure according to claim 1, wherein said first and second fixed elements face said mobile element, said first fixed elements are arranged so as to form with said mobile element a first sensing capacitor, said second fixed elements are arranged so as to form with said mobile element a second sensing capacitor, said first and second sensing capacitors having a different value of capacitance at rest and a different capacitive variation as a function of displacement of said mobile element, and said at least one of the full-scale value and sensitivity value is a function of said capacitance at rest and/or of said capacitive variation of said first and second sensing capacitors.

3. The sensing structure according to claim 2, wherein said first and second sensing capacitors are parallel-plate capacitors.

4. The sensing structure according to claim 1, wherein said mobile element comprises a body extending substantially along a plane and mobile electrodes extending from said body in a first direction and/or a second direction along said plane, said first and second fixed elements extending in said first direction and/or second direction substantially parallel to and facing respective mobile electrodes, and said mobile element is adapted to displace in said first direction and/or second direction as a function of said quantity to be detected.

5. The sensing structure according to claim 4, wherein said first fixed elements, at rest, are positioned at a first distance from said respective mobile electrodes, and said second fixed elements, at rest, are positioned at a second distance from said respective mobile electrodes, said first distance is smaller than said second distance.

6. The sensing structure according to claim 1, wherein said mobile element comprises a body extending substantially along a plane and being free to rotate about a tilting axis away from said plane, and said first and second fixed elements are underneath said plane and face said body, said first fixed elements having a first facing area that faces said body and positioned at a first distance from said tilting axis, said second fixed electrodes having a second facing area that faces said body and positioned at a second distance from said tilting axis, said first facing area and said first distance are different from said second facing area and said second distance, respectively, the first fixed elements having a greater facing area and a greater distance from said tilting axis than the second fixed elements.

7. The sensing structure according to claim 1, wherein said mobile element comprises a body including a plurality of portions electrically insulated from one another by one or more insulation barriers, and said first and second fixed elements are capacitively coupled to each of said portions.

8. The sensing structure according to claim 1, wherein said body is formed by first and second halves, the first and second halves are separated by a first insulation barrier, said first fixed elements and said second fixed elements being capacitively coupled to each of said first and second halves.

9. The sensing structure according to claim 1, wherein said first fixed elements comprise first electrodes electrically connected to one another, and said second fixed elements comprise second electrodes electrically connected to one another, said first electrodes being electrically insulated from the second electrodes.

10. The sensing structure according to claim 1 wherein a distance between adjacent first fixed elements that are capacitively coupled to a first element of the mobile element is smaller than a distance between adjacent second fixed elements that are capacitively coupled to a second element of the mobile element.

11. A sensor comprising:
   an electromechanical sensing structure comprising:
      a mobile element displaceable in response to a quantity to be detected;
      a plurality of first fixed elements capacitively coupled to said mobile element, said plurality of first fixed elements configured to operate with said mobile element to define a first detection condition of said quantity; and
      a plurality of second fixed elements capacitively coupled to said mobile element, said plurality of second fixed elements configured to operate with said mobile element to define a second detection condition of said quantity, wherein said first detection condition is different from said second detection condition with respect to a full-scale value and a sensitivity value associated with detection of said quantity, wherein a total number of all of said first fixed elements is higher than a total number of all of said second fixed elements, a lower value of said full scale and a higher value of said sensitivity is associated with said first fixed elements;

processing electronics comprising a processing stage and a gain stage in communication with the processing stage, the processing stage configured to process output from the electromechanical sensing structure.

12. The sensor according to claim 11, wherein the processing stage is coupled to said electromechanical sensing structure and a selector adapted to couple selectively said plurality of first fixed elements or said plurality of second fixed elements to said processing stage, for selection of said first or second detection conditions.

13. The sensor according to claim 12, wherein said pluralities of first fixed elements are connected electrically to one another and to a first sensing contact, said pluralities of second fixed elements are connected electrically to one another and to a second sensing contact, and said selector is adapted to connect said processing stage selectively to said first sensing contact or said second sensing contact so as to enable detection of said first or second detection conditions, respectively.

14. The sensor according to claim 12, wherein said selector further comprises switch elements configured to connect electrically to one another insulated portions of a body of the mobile element in order to vary a value associated with said first or second detection conditions.

15. The sensor according to claim 11, wherein the gain stage is connected to an output of said processing stage, said selector being further adapted to vary gain of said gain stage in order to vary a value associated with said first or second detection conditions.

16. The sensor according to claim 11, wherein said sensor is a uniaxial or a biaxial accelerometer, and said quantity to be detected is an acceleration or a deceleration of said sensor.

17. The sensor according to claim 11, wherein a distance between adjacent first fixed elements that are capacitively coupled to a first element of the mobile element is smaller than a distance between adjacent second fixed elements that are capacitively coupled to a second element of the mobile element.

18. An electronic system for use in a motor vehicle, comprising:
an electromechanical sensing structure comprising:
a mobile element displaceable in response to a quantity to be detected;
a plurality of first fixed elements capacitively coupled to said mobile element, said plurality of first fixed elements configured to operate with said mobile element to define a first detection condition of said quantity;
a plurality of second fixed elements capacitively coupled to said mobile element, said plurality of second fixed elements configured to operate with said mobile element to define a second detection condition of said quantity, wherein said first detection condition is different from said second detection condition with respect to a full-scale value and a sensitivity value associated with detection of said quantity;
wherein said mobile element comprises a body extending substantially along a plane and being free to rotate about a tilting axis away from said plane, and said first and second fixed elements are underneath said plane and face said body, said first fixed elements having a first facing area that faces said body and positioned at a first distance from said tilting axis, said second fixed electrodes having a second facing area that faces said body and positioned at a second distance from said tilting axis, said first facing area and said first distance are different from said second facing area and said second distance, respectively, a lower value of said full scale and a higher value of said sensitivity correspond to said first or second fixed elements having a greater facing area and a greater distance from said tilting axis;
a processing stage coupled to said electromechanical sensing structure, said processing stage being adapted to process said quantity to be detected in order to control an airbag, an ABS, and/or a stability-control system of a motor vehicle.

19. The electronic system of claim 18, wherein said pluralities of first fixed elements are connected electrically to one another and to a first sensing contact, said pluralities of second fixed elements are connected electrically to one another and to a second sensing contact, and a selector adapted to couple said pluralities of said first and second fixed elements to said processing stage.

20. The electronic system of claim 18, further comprising a gain stage connected to an output of said processing stage to vary a value associated with said first or second detection conditions.

21. The electronic system of claim 18, wherein said electromechanical sensing structure is a uniaxial or a biaxial accelerometer.

22. The electronic system of claim 18, further comprising switch elements configured to connect electrically to one another insulated portions of a body of said mobile element in order to vary a value associated with said first or second detection conditions.

23. A microelectromechanical sensing structure comprising:
a mobile element adapted to be displaced as a function of a quantity to be detected;
first fixed elements capacitively coupled to said mobile element and configured to implement with said mobile element to provide first detection conditions of said quantity;
second fixed elements capacitively coupled to said mobile element and configured to implement with said mobile element to provide second detection conditions of said quantity, wherein said second detection conditions are different from said first detection conditions with respect to a full-scale value and a sensitivity value associated with detection of said quantity;
wherein said mobile element comprises a body extending substantially along a plane and being free to rotate about a tilting axis away from said plane, and said first and second fixed elements are underneath said plane and face said body, said first fixed elements having a first facing area that faces said body and positioned at a first distance from said tilting axis, said second fixed electrodes having a second facing area that faces said body and positioned at a second distance from said tilting axis, said first facing area and said first distance are different from said second facing area and said second distance, respectively, a lower value of said full scale and a higher value of said sensitivity correspond to said first or second fixed elements having a greater facing area and a greater distance from said tilting axis.

* * * * *